United States Patent
Klein

(10) Patent No.: US 7,280,162 B2
(45) Date of Patent: *Oct. 9, 2007

(54) APPARATUS FOR ASSISTING VIDEO COMPRESSION IN A COMPUTER SYSTEM

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/333,786

(22) Filed: Jan. 17, 2006

(65) Prior Publication Data

US 2006/0176950 A1 Aug. 10, 2006

Related U.S. Application Data

(63) Continuation of application No. 09/048,932, filed on Mar. 26, 1998, now Pat. No. 6,987,545.

(51) Int. Cl.
*H04N 9/64* (2006.01)

(52) U.S. Cl. ............... 348/718; 348/405; 348/430; 348/568

(58) Field of Classification Search ........ 348/718, 348/716–717, 567, 568, 412.1, 415.1, 430.1, 348/552; 375/240.12; 709/203; *H04N 9/64*
See application file for complete search history.

(56) References Cited

U.S. PATENT DOCUMENTS

| | | |
|---|---|---|
| 4,546,383 A | 10/1985 | Abramatic et al. |
| 5,287,189 A | 2/1994 | Ersoz et al. |
| 5,438,374 A | 8/1995 | Yan |
| 5,469,208 A | 11/1995 | Dea |
| 5,510,857 A | 4/1996 | Kopet et al. |
| 5,555,028 A | 9/1996 | Kim |
| 5,684,538 A | 11/1997 | Nakaya et al. |
| 5,717,615 A | 2/1998 | Pirson et al. |
| 5,724,441 A | 3/1998 | Yoshida |
| 5,774,676 A | 6/1998 | Stearns et al. |
| 5,787,199 A | 7/1998 | Lee |
| 5,812,789 A | 9/1998 | Diaz et al. |
| 5,825,423 A | 10/1998 | Jung |
| 5,859,651 A | 1/1999 | Potu |
| 5,909,559 A | 6/1999 | So |
| 5,926,223 A | 7/1999 | Hardiman |
| 6,014,181 A | 1/2000 | Sun |

(Continued)

*Primary Examiner*—Trang U. Tran
(74) *Attorney, Agent, or Firm*—TraskBritt, PC

(57) ABSTRACT

One embodiment of the present invention provides an apparatus that facilitates compression of video data in a computer system by performing the time-consuming task of computing the difference between successive frames of video data. Thus, one embodiment of the present invention can be characterized as an apparatus for compressing video data. This apparatus includes a video input port, for receiving video data for a current video frame, and a video input buffer, for storing video data from the video input port. The apparatus additionally includes a previous frame buffer, for storing at least a portion of a previous video frame, as well as an operation unit, for performing an operation between video data from the video input buffer and video data from the previous frame buffer. The embodiment also includes a result buffer coupled to the operation unit, for storing the result of an operation from the operation unit.

9 Claims, 4 Drawing Sheets

U.S. PATENT DOCUMENTS

| | | |
|---|---|---|
| 6,037,947 A | 3/2000 | Nelson et al. |
| 6,040,845 A | 3/2000 | Melo et al. |
| 6,118,491 A | 9/2000 | Wu et al. |
| 6,151,074 A | 11/2000 | Werner |
| 6,169,554 B1 | 1/2001 | Deering |
| 6,211,912 B1 | 4/2001 | Shararay |
| 6,246,719 B1 | 6/2001 | Agarwal |
| 6,427,194 B1 | 7/2002 | Owen et al. |

APPARATUS FOR ASSISTING VIDEO COMPRESSION IN A COMPUTER SYSTEM

CROSS-REFERENCE TO RELATED APPLICATIONS

This application is a continuation of application Ser. No. 09/048,932, filed Mar. 26, 1998, now U.S. Pat. No. 6,987,545, issued Jan. 17, 2006, which is related to a non-provisional application by the same inventor as the parent application also filed on Mar. 26, 1998 entitled, "Method for Assisting Video Compression in a Computer System," having Ser. No. 09/048,933, pending.

BACKGROUND OF THE INVENTION

1. Field of the Invention

The present invention relates compressing video data, and more specifically to an apparatus that provides assistance to a computer system in compressing a stream of video data on-the-fly, as the video data streams into the computer system.

2. State of the Art

As video data is increasingly used in computer systems in applications such as video conferencing and video recording, computer systems often cannot keep pace with the computational requirements of video data. Video data streams typically have extremely large bandwidth requirements that can tax the capabilities of even the most high-speed processor to compress the video data for storage, or for transmission across a computer network or a telephone system. This compression is typically performed by a central processing unit (CPU) in a computer system with a resulting loss in image clarity due to the failure of the CPU to keep pace with the video data. Complex scenes having many elements that are in motion represent the greatest challenge because they place a tremendous burden on the CPU during the compression and data transfer processes.

A time-consuming step in the compression of video data is to compute differences between successive video frames. A CPU typically computes a difference frame by reading a current video frame into memory and computing the difference between the current video frame and a previous video frame, which was previously stored into a memory in the computer system. Computing the difference typically involves performing an exclusive-OR operation between the current video frame and the previous video frame. In general, any function that effectively represents the difference between two successive video frames can be used with only minor modifications to the related compression algorithm. Hence, a large number of possible functions can be used to compute the difference between successive video frames.

What is needed is an apparatus or method for off-loading the time-consuming task of computing the difference between successive frames of video data from the CPU of a computer.

BRIEF SUMMARY OF THE INVENTION

One embodiment of the present invention provides an apparatus that facilitates compression of video data in a computer system by performing the time-consuming task of computing the difference between successive frames of video data. This frees the often overburdened central processing unit from this time-consuming compression operation and can thereby improve the handling of video data. Thus, one embodiment of the present invention can be characterized as an apparatus for compressing video data. This apparatus includes a video input port, for receiving video data for a current video frame, and a video input buffer, for storing video data from the video input port. The apparatus additionally includes a previous frame buffer, for storing at least a portion of a previous video frame, as well as an operation unit, for performing an operation between video data from the video input buffer and video data from the previous frame buffer. The embodiment also includes a result buffer coupled to the operation unit, for storing the result of an operation from the operation unit.

Another embodiment of the present invention includes a memory port coupled to the previous frame buffer and the result buffer, for transferring data to and from a memory that contains video data for the current video frame and the previous video frame. A variation on this embodiment includes a memory coupled to the memory port for storing the video data, wherein the video data is stored in a current video frame and a difference frame in the memory. In a further variation on this embodiment, the memory stores a current video frame and a previous video frame in the same location in the memory, allowing the current video frame to be written over the previous video frame. In yet another variation on this embodiment, the memory additionally stores instructions and data for a central processing unit of a computer system.

In another embodiment of the present invention, the operation unit performs an exclusive-OR operation between data from the video input buffer and data from the previous frame buffer.

In another embodiment of the present invention, the video input buffer stores a block of data from the video input port; the previous frame buffer stores a block of data from the previous video frame; and the result buffer stores a block of data from the operation unit. In this embodiment, the operation unit performs an operation between a block of data from the video input port and a block of data from the previous frame buffer.

In another embodiment of the present invention, the apparatus resides inside a core logic chip of the computer system. In another embodiment, the apparatus comprises part of a video conferencing system. In yet another embodiment, the apparatus includes additional resources for compressing the video data from the video input port.

Another embodiment of the present invention includes a color space conversion circuit coupled between the video input port and the video input buffer.

DEFINITIONS

Color space conversion unit—circuitry that maps one set of color values to another set of color values.

Computing on-the-fly—performing a computational operation on data streams through a computer system.

Core logic unit—circuitry within a computer system that interfaces a processor to a memory and a peripheral bus and performs other functions.

Difference engine—circuitry that computes a difference function between successive video frames. This difference function may be an exclusive-OR operation.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

DESCRIPTION OF A FIRST EMBODIMENT OF THE COMPUTER SYSTEM

Figure 1:
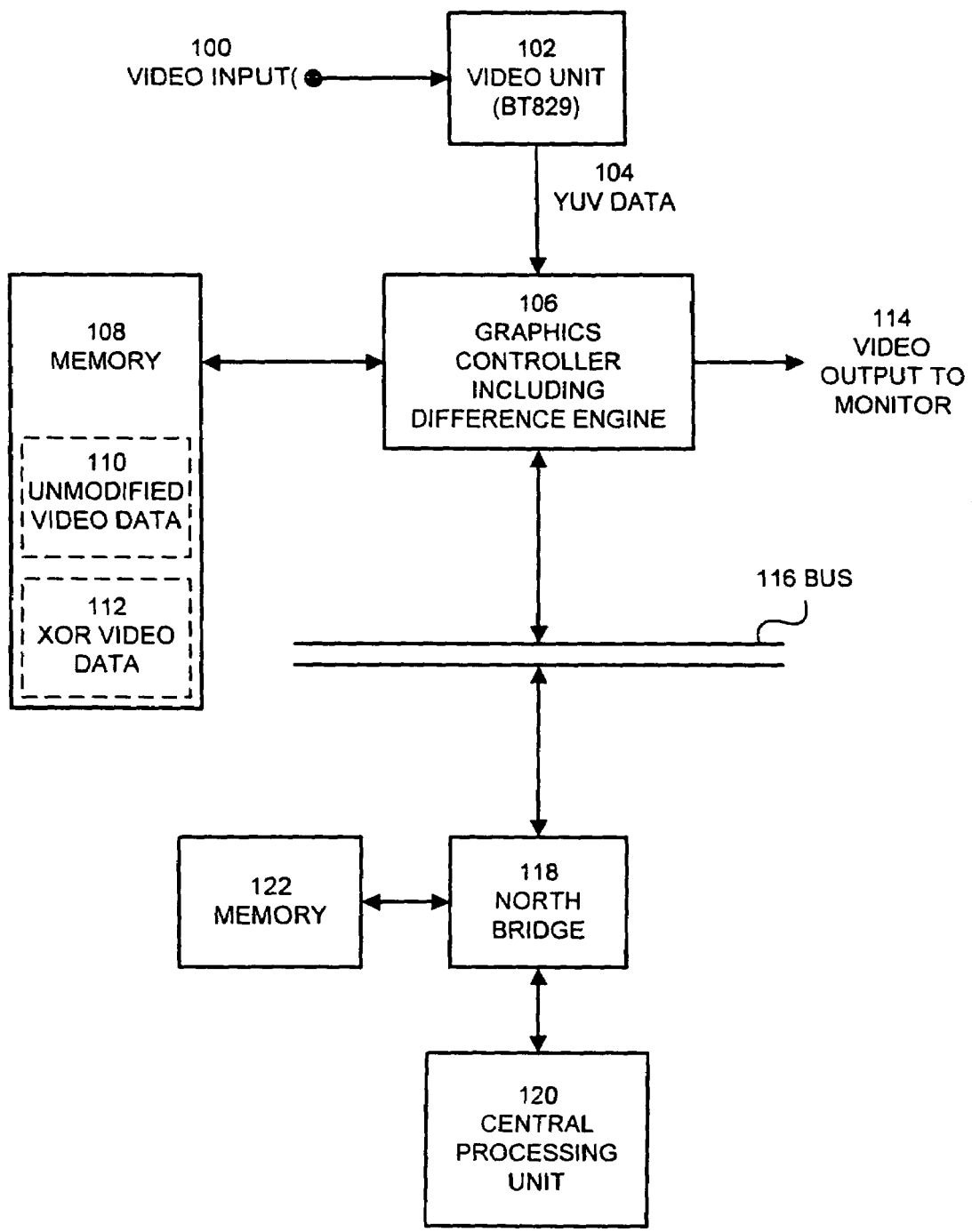
FIG. 1 illustrates a computer system including a graphics controller with a difference engine in accordance with an embodiment of the present invention.

FIG. 1 illustrates a computer system including a graphics controller with a difference engine 106 in accordance with an embodiment of the present invention. The embodiment illustrated in FIG. 1 includes central processing unit (CPU) 120, which is coupled through north bridge 118 to memory 122 and bus 116. CPU 120 may be any type of central processing unit that can be used in a computer system. This includes, but is not limited to, a microprocessor CPU, a mainframe CPU and a device controller CPU. North bridge 118 forms part of the "core logic" for the computer system. This core logic ties together and coordinates operations of components in the computer system. Memory 122 can be any type of semiconductor memory that can be used in a computer system. Bus 116 can be any type of computer system bus. In one embodiment, bus 116 includes a PCI bus.

Bus 116 is also coupled to graphics controller 106, which includes a difference engine. In this embodiment, graphics controller 106 includes circuitry to perform a difference operation between successive video frames. Graphics controller 106 is also coupled to memory 108 and video unit 102. Graphics controller 106 additionally produces video output 114, which feeds into a computer system monitor.

Memory 108 may be any type of semiconductor memory that may be used in a computer system. In one embodiment of the present invention, memory 108 is a dedicated graphics memory for graphics controller 106, which is separate from memory 122. In another embodiment, memory 108 and memory 122 are part of the same memory. In the illustrated embodiment, memory 108 includes an area for storing unmodified video data 110 and an area for storing XOR video data 112. In one embodiment, the area for storing unmodified video data 110 stores a previous frame of unmodified video, and the area for storing XOR video data 112 stores a difference frame containing the exclusive-OR of a current frame and the previous frame. Other embodiments of the present invention may use other difference functions besides exclusive-OR.

Video unit 102 receives video input 100 in analog form and converts it to digital form. In the illustrated embodiment, video unit 102 receives video input 100 in either PAL or NTSC format, and produces digital video data in YUV format data 104. Video unit 102 may include the BT829 chip produced by Rockwell Semiconductor Systems, Inc. of Newport Beach, Calif. Alternatively, the Rockwell BT848 part may be used to transfer data across a computer system bus into system memory or into a video controller's memory. (In some embodiments, these may be the same memory). Additionally, video data may be received from external sources through serial buses that can stream video data into system memory, usually by transferring data across bus 116. These serial buses may include the USB or the IEEE 1394 bus.

The embodiment illustrated in FIG. 1 operates as follows. Video input 100 streams into video unit 102, which converts video input 100 into digital YUV format data 104. YUV format data 104 feeds into graphics controller 106, which produces video output 114 for display on a computer system monitor. Graphics controller 106 additionally stores unmodified video data into unmodified video data 110 within memory 108. Graphics controller 106 also computes the difference between a current video frame and a previous video frame and stores this difference information in XOR video data 112 in memory 108. This difference information is used by CPU 120 to complete the compression process for the video data stream.

DESCRIPTION OF A SECOND EMBODIMENT

Figure 2:
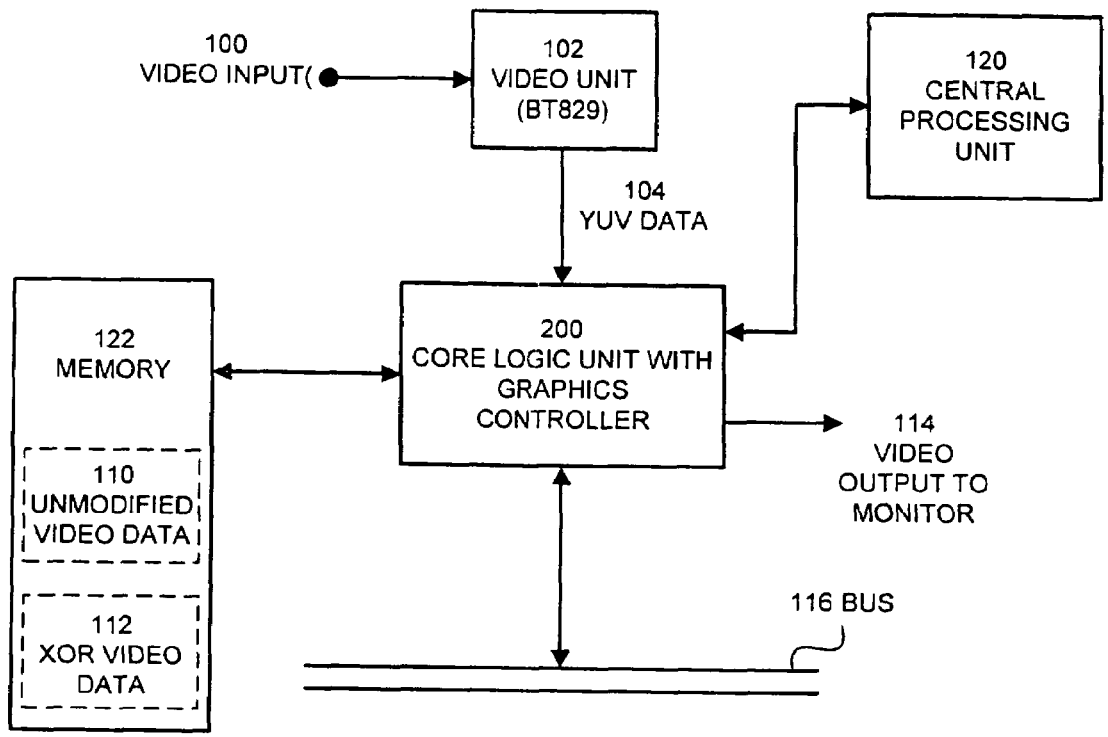
FIG. 2 illustrates a computer system including a graphics controller incorporated into a core logic unit in accordance with another embodiment of the present invention.

FIG. 2 illustrates a computer system including a graphics controller incorporated into a core logic unit 200 in accordance with another embodiment of the present invention. This embodiment is similar to the embodiment illustrated in FIG. 1, except that graphics controller 106 and north bridge 118 from FIG. 1 are combined into a single core logic unit with graphics controller 200. Additionally, memory 108 and memory 122 from FIG. 1 are combined into a single memory 122 in FIG. 2.

In the embodiment illustrated in FIG. 2, core logic unit 200 includes circuitry to compute the difference between successive video frames as well as circuitry to perform other graphics controller functions.

The embodiment illustrated in FIG. 2 operates in the same way as the embodiment illustrated in FIG. 1, except that in FIG. 2, unmodified video data 110 and XOR video data 112 are not stored in a separate graphics memory 108, but are rather stored in the system memory 122. Hence, CPU 120 does not have to reach out across bus 116 to retrieve XOR video data 112 from a separate graphics memory to complete the compression process. It merely has to retrieve the XOR video data 112 from the system memory.

Description of Internal Structure of Graphics Controller

Figure 3:
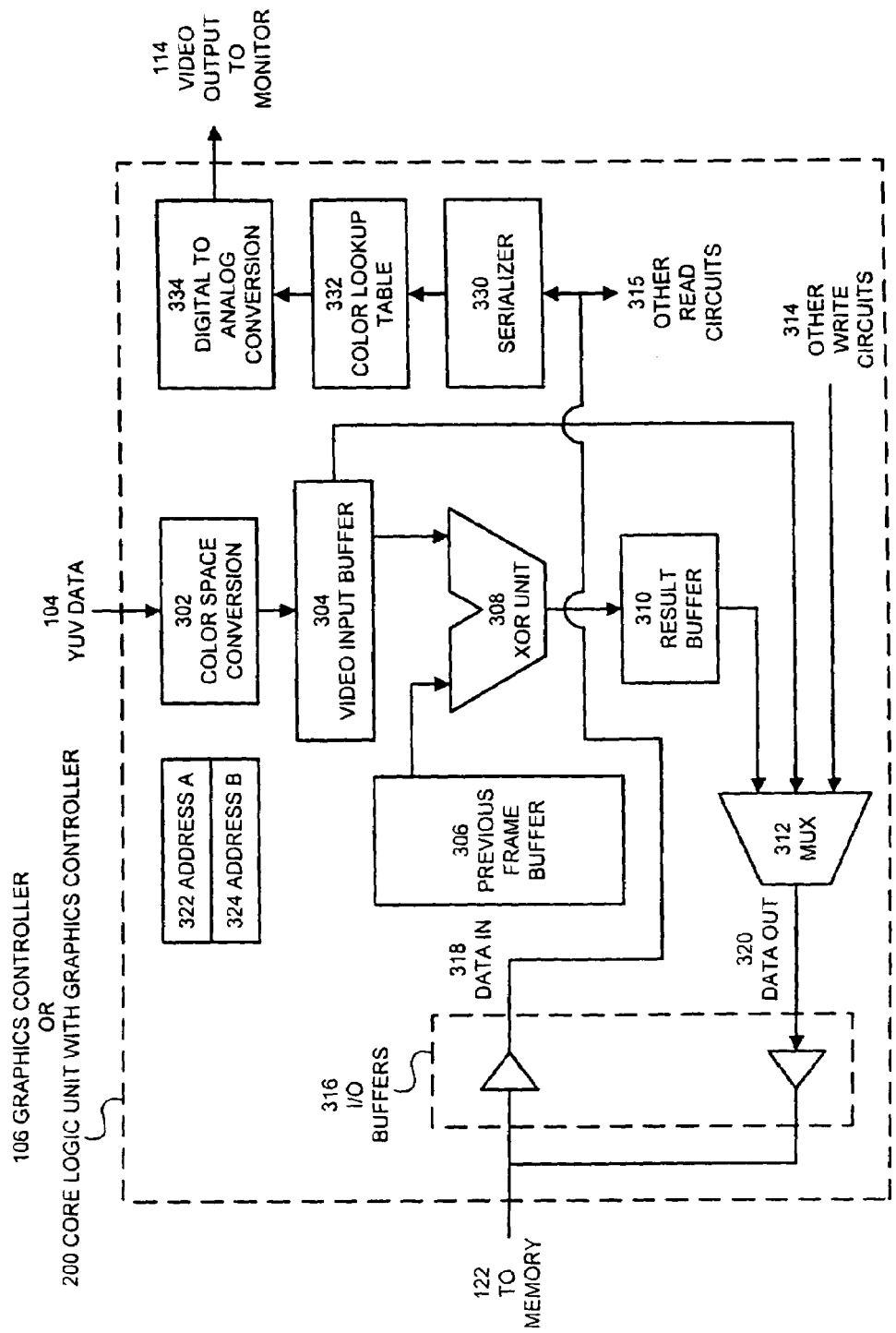
FIG. 3 illustrates the internal structure of a portion of the graphics controller that computes the difference between successive video frames in accordance with an embodiment of the present invention.

FIG. 3 illustrates the internal structure for a portion of a graphics controller that computes the difference between successive video frames in accordance with an embodiment of the present invention. The circuitry illustrated in FIG. 3 can exist in either graphics controller 106 from FIG. 1 or in core logic unit 200 from FIG. 2. The circuitry illustrated in FIG. 3 includes an input for YUV format data 104, which feeds through color space conversion module 302. This module may perform color re-mapping on YUV format data 104. The output of color space conversion module 302 feeds into video input buffer 304. From video input buffer 304, the video data feeds either into XOR unit 308 and multiplexer (MUX) 312. XOR unit 308 takes another input from previous frame buffer 306 and generates an output, which feeds into result buffer 310. Data from result buffer 310 feeds through MUX 312 and I/O buffers 316 into memory 108. MUX 312 takes another input from other write circuits 314. This allows data to be written to memory 122 from other sources. Data read from memory 122 feeds into previous frame buffer 306, and then into XOR unit 308. Alternatively, data read from memory 122 may feed into other read circuits 315, allowing data to be read from memory 122 by other sources. Data read from memory 122 may also pass through serializer 330, color lookup table 332 and digital-to-analog converter 334 before becoming video output 114 to a monitor. Serializer 330 converts data read from memory 122 into a serial bitstream. This bitstream is modified in color lookup table 332, and is ultimately converted into analog form in digital-to-analog converter 334.

The circuitry illustrated in FIG. 3 operates as follows. Video data in YUV format data 104 from video unit 102 streams into video input buffer 304 through color space conversion module 302. From video input buffer 304, this video data feeds through MUX 312 and J/O buffers 316 into unmodified video data 110 within memory 122. At the same time, data for a previous frame from unmodified video data 110 in memory 122 feeds into previous frame buffer 306 through I/O buffer 316. From previous frame buffer 306, this data feeds into XOR unit 308. XOR unit 308 computes the difference between data from the previous frame, stored in previous frame buffer 306, and data from the current frame, stored in video input buffer 304. The output of XOR unit 308 feeds into result buffer 310. From result buffer 310, this data feeds through MUX 312 and I/O buffers 316 into an area for storing XOR video data 112 within memory 122. CPU 120 then uses this difference information to compress the video data.

In one embodiment, data is processed a block at a time through XOR unit 308, wherein a block includes multiple words of data.

In the embodiment illustrated in FIG. 3, data for the current frame is overwritten over data for the previous frame as the data for the previous frame is retrieved into previous frame buffer 306. This allows the frame data to be stored in one location without using "ping pong" buffers.

The embodiment illustrated in FIG. 3 also includes registers for storing address A 322 and address B 324. Address A 322 and address B 324 are pointers into memory 122 for keeping track of data within unmodified video data 110 and XOR video data 112 within memory 122.

Description of Method for Compressing Video Data

Figure 4:
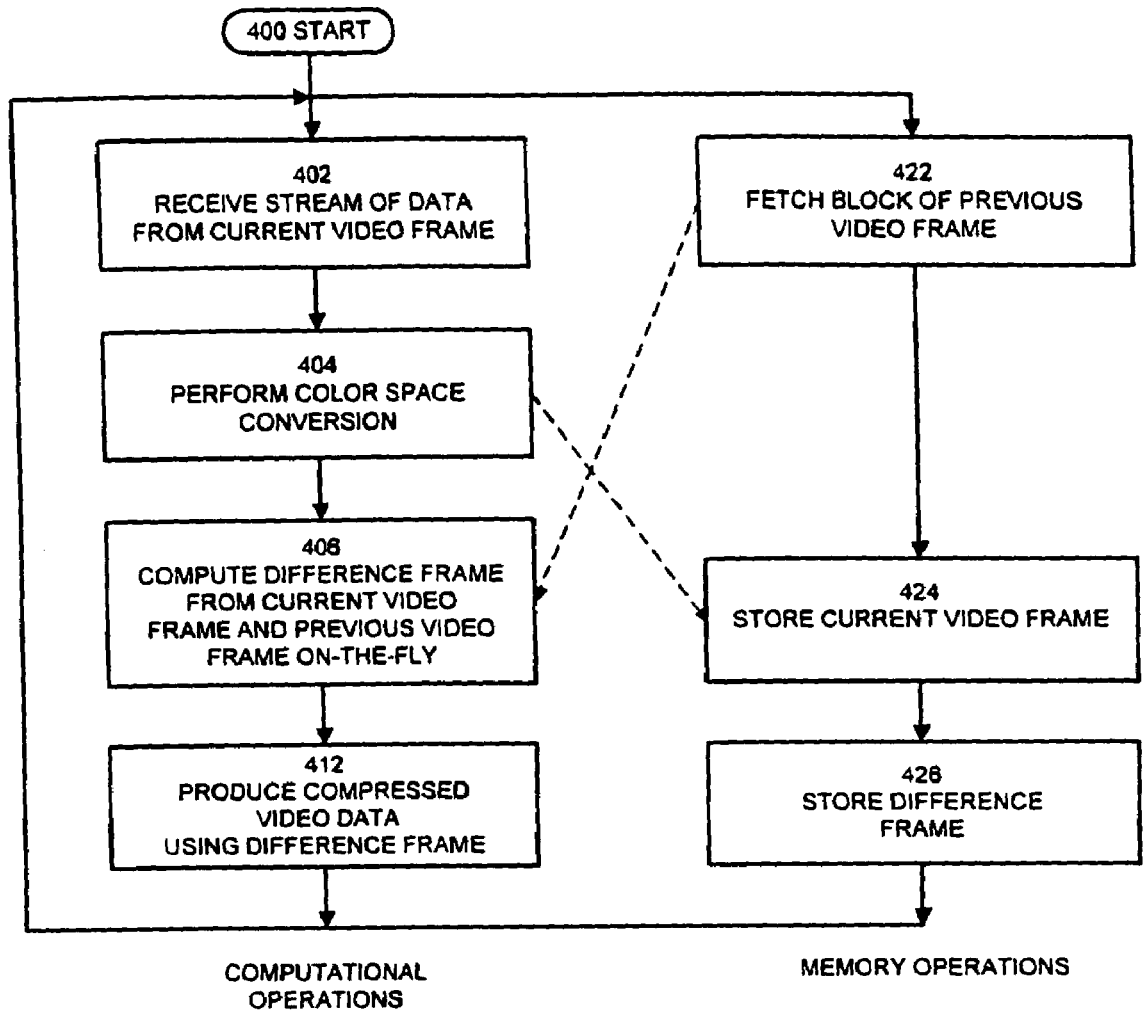
FIG. 4 is a block diagram illustrating a method for compressing video data in a computer system in accordance with an embodiment of the present invention.

FIG. 4 is a flow chart illustrating a method for compressing video data in a computer system in accordance with an embodiment of the present invention. This flow chart is divided into two columns. The column on the left-hand side represents operations of the computational unit, and the column on the right-hand side represents operations of the memory system. In this embodiment, the system starts in state 400. From state 400, the computational unit proceeds to state 402. In state 402, the computational unit receives a stream of data from a current video frame from a video source. The computational unit next proceeds to state 404. In state 404, the computational unit performs a color space conversion on the video data. The computational unit next proceeds to state 406. In state 406, the computational unit computes a difference frame from a current video frame and a previous video frame received from the memory system "on-the-fly" as the current video frame streams into the computer system. In one embodiment, this difference computation takes place without intervention by the CPU 120. The computational unit next proceeds to state 412. In state 412, the computational unit produces compressed video data using the difference frame. The computational unit then loops back around to state 402 to process more video data.

From state 400, the memory system proceeds to state 422. In state 422, the memory system fetches a block of data from the previous frame. This block of data is forwarded to the computational unit for use in state 406. The memory system next proceeds to state 424, in which the memory system stores the current video frame—received from the computational unit in state 404—into memory 122. The memory system next proceeds at state 426. In state 426, the memory system stores the difference frame into memory 122. The memory system then loops back around to state 422 to process more video data.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. An apparatus for assisting in compressing video data in a computer system including a central processing unit and a system memory, comprising:
a video input port configured to electrically couple to a video unit for receiving video data for a current video frame from streaming video data;
a video input buffer coupled to the video input port for storing the video data from the video input port;
a previous frame buffer for storing at least a portion of a previous video frame;
an operation unit coupled to the video input buffer and the previous frame buffer for computing a difference frame from data from the video input buffer and data from the previous frame buffer; and
a result buffer coupled to the operation unit, the result buffer further including a memory interface configured to couple with the system memory via a first bus independent of a second bus configured for coupling with the central processing unit via a north bridge chip, the result buffer for temporarily buffering the difference frame prior to storing the difference frame in the system memory.

2. The apparatus of claim 1, further comprising a memory port coupled to the previous frame buffer and the result buffer.

3. The apparatus of claim 2, wherein the system memory couples to the memory port, the system memory partitioned into a current frame area and a difference frame area.

4. The apparatus of claim 3, wherein the memory stores a current video frame and a previous video frame in the same location in the system memory, allowing the current video frame to be written over the previous video frame.

5. The apparatus of claim 3, wherein the system memory also stores instructions and data for the central processing unit of the computer system.

6. The apparatus of claim 1, wherein the operation unit performs an exclusive-OR operation between data from the video input buffer and data from the previous frame buffer.

7. The apparatus of claim 1, wherein the operation unit is configured to perform an operation between a block of data from the video input port and a block of data from the previous frame buffer.

8. The apparatus of claim 1, including additional resources within the apparatus for compressing the video data from the video input port.

9. The apparatus of claim 1, wherein the apparatus is further configured to operate within the north bridge chip of the computer system to enable the central processing unit to retrieve the difference frame exclusive of the second bus and directly from the system memory via the north bridge chip for further compression of the video data by the central processing unit.

* * * * *